United States Patent
Beharrell et al.

(10) Patent No.: US 11,080,211 B2
(45) Date of Patent: Aug. 3, 2021

(54) STORING DATA FROM LOW LATENCY STORAGE

(71) Applicant: Arm Limited, Cambridge (GB)

(72) Inventors: Alex Beharrell, Cambridge (GB);
Andrew Merritt, Cambridge (GB);
Raghavendra Adiga Bandimutt, Cambridge (GB)

(73) Assignee: Arm Limited, Cambridge (GB)

( * ) Notice: Subject to any disclaimer, the term of this patent is extended or adjusted under 35 U.S.C. 154(b) by 138 days.

(21) Appl. No.: 16/217,297

(22) Filed: Dec. 12, 2018

(65) Prior Publication Data
US 2020/0192829 A1    Jun. 18, 2020

(51) Int. Cl.
*G06F 13/16* (2006.01)
*G06F 12/08* (2016.01)
*G06F 13/20* (2006.01)

(52) U.S. Cl.
CPC ........... *G06F 13/161* (2013.01); *G06F 12/08* (2013.01); *G06F 13/1684* (2013.01); *G06F 13/20* (2013.01)

(58) Field of Classification Search
CPC ........ G06F 12/00; G06F 13/00; G06F 13/161; G06F 12/1684; G06F 12/08; G06F 13/1684; G06F 13/20

USPC .................................................. 711/100, 154
See application file for complete search history.

(56) References Cited

U.S. PATENT DOCUMENTS

| | | | | |
|---|---|---|---|---|
| 2010/0185811 A1* | 7/2010 | Kwon | .................. | G06F 12/0246 711/105 |
| 2011/0173393 A1* | 7/2011 | Isono | .................. | G06F 12/0844 711/122 |
| 2015/0046634 A1* | 2/2015 | Maeda | ................ | G06F 12/0888 711/103 |
| 2015/0127912 A1* | 5/2015 | Solihin | ............... | G06F 12/0842 711/125 |
| 2015/0220272 A1* | 8/2015 | Bachar | .................. | G06F 3/0631 711/173 |

* cited by examiner

*Primary Examiner* — Tuan V Thai
(74) *Attorney, Agent, or Firm* — Nixon & Vanderhye P.C.

(57) ABSTRACT

There is provided an apparatus that includes a first port that receives first data of a first type from a first storage circuit. A second port receives second data of a second type from a second storage circuit having a lower worst case latency in hardware than the first storage circuit. A third port receives access requests for the first data and the second data from a processing circuit. When one of the access requests is received for the first data, it is forwarded to the first storage circuit and when the one of the access requests is received for the second data, it is forwarded to the second storage circuit. A shared storage circuit stores the first data and the second data and has a storage capacity.

16 Claims, 5 Drawing Sheets

STORING DATA FROM LOW LATENCY STORAGE

TECHNICAL FIELD

The present disclosure relates to data processing. More particularly it relates to data storage.

BACKGROUND

A memory hierarchy can include a plurality of storage circuits. At each level of the hierarchy, the size of the storage circuits increases but the time taken to access data in that storage circuit also increases together with the variance in the access time. In the case of real-time applications, where an "immediate" response to an event could be required, long latencies and unpredictability of latencies are problematic.

SUMMARY

In at least one example embodiment there is an apparatus comprising: a first port adapted to receive first data of a first type from a first storage circuit; a second port adapted to receive second data of a second type from a second storage circuit having a lower worst case latency in hardware than the first storage circuit; a third port adapted to receive access requests for the first data and the second data from a processing circuit, wherein when one of the access requests is received for the first data, it is forwarded to the first storage circuit and when the one of the access requests is received for the second data, it is forwarded to the second storage circuit; and a shared storage circuit adapted to store the first data and the second data, the shared storage circuit having a storage capacity.

In at least one example embodiment there is a method comprising: receiving first data of a first type from a first storage circuit; receiving second data of a second type from a second storage circuit having a lower worst case latency in hardware than the first storage circuit; receiving access requests for the first data and the second data from a processing circuit, wherein when one of the access requests is received for the first data, it is forwarded to the first storage circuit and when the one of the access requests is received for the second data, it is forwarded to the second storage circuit; and storing the first data and the second data in a shared storage circuit, the shared storage circuit having a storage capacity.

In at least one example embodiment there is an apparatus comprising: means for receiving first data of a first type from a means for storing first data; means for receiving second data of a second type from a means for storing second data having a lower worst case latency in hardware than the means for storing first data; means for receiving access requests for the first data and the second data from a means for processing, wherein when one of the access requests is received for the first data, it is forwarded to the means for storing first data and when the one of the access requests is received for the second data, it is forwarded to the means for storing second data; and means for storing the first data and the second data together, the means for storing the first data and the second data together having a storage capacity.

BRIEF DESCRIPTION OF THE DRAWINGS

The present techniques will be described further, by way of example only, with reference to embodiments thereof as illustrated in the accompanying drawings, in which.

DESCRIPTION OF EMBODIMENTS

Figure 1:
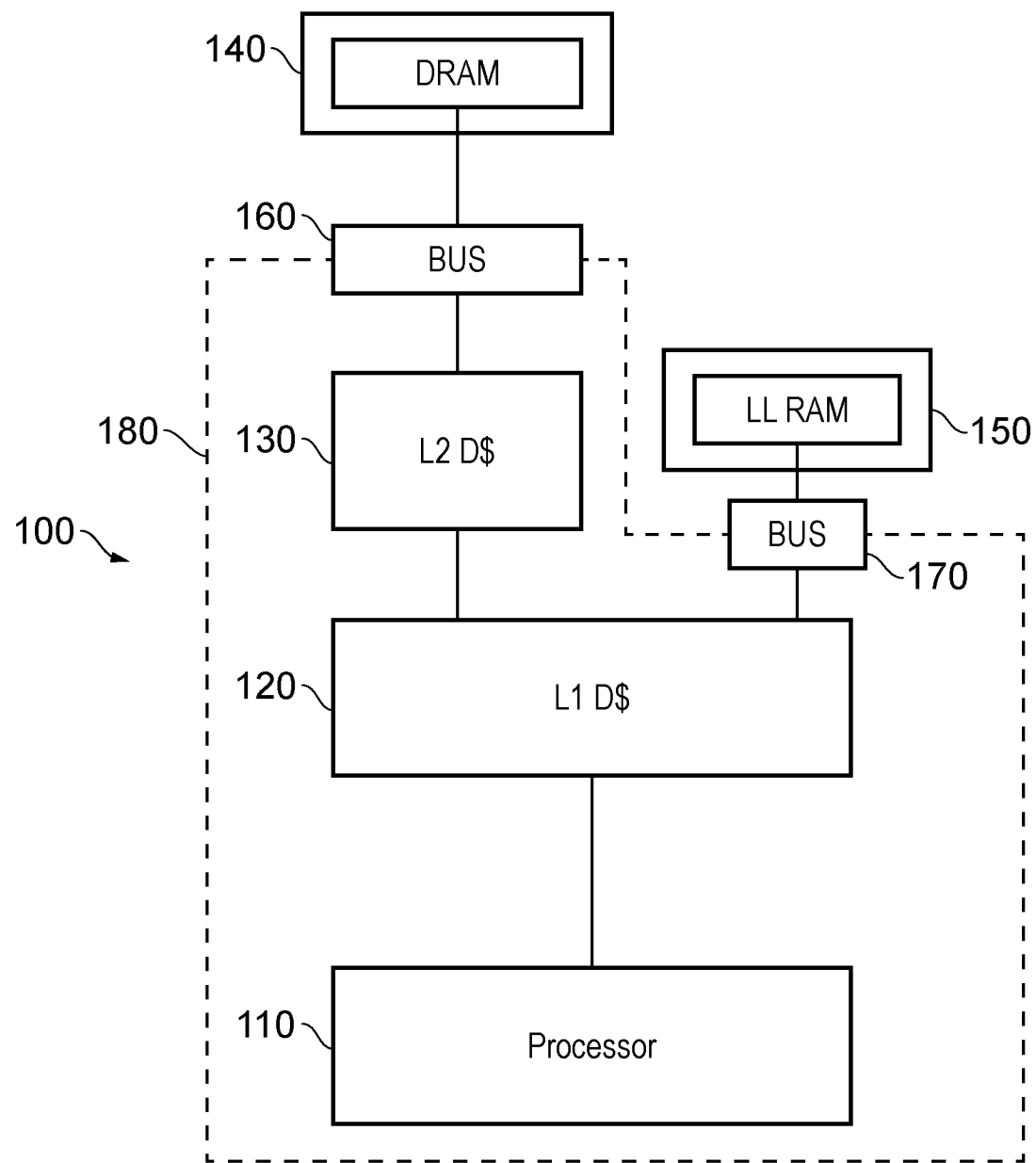
FIG. 1 shows an apparatus in accordance with some embodiments.

Before discussing the embodiments with reference to the accompanying figures, the following description of embodiments is provided.

At least some embodiments provide an apparatus comprising: a first port adapted to receive first data of a first type from a first storage circuit; a second port adapted to receive second data of a second type from a second storage circuit having a lower worst case latency in hardware than the first storage circuit; a third port adapted to receive access requests for the first data and the second data from a processing circuit, wherein when one of the access requests is received for the first data, it is forwarded to the first storage circuit and when the one of the access requests is received for the second data, it is forwarded to the second storage circuit; and a shared storage circuit adapted to store the first data and the second data, the shared storage circuit having a storage capacity.

In these embodiments, the apparatus includes two ports from which data can be received. One of the ports connects to first storage circuitry (e.g. higher latency storage circuitry) and the other port connects to second storage circuitry (e.g. comparatively lower latency storage circuitry). The latency here is a function of the circuitry itself and not the time or distance taken to route a request to the circuitry. In other words, the lower latency circuitry is lower latency than the higher latency circuitry not because it is nearer or because requests have less circuitry to pass through to reach the lower latency circuitry, but because the lower latency circuitry operates much more quickly (in a worst case scenario) than the higher latency circuitry. In some embodiments, the higher latency storage circuitry could itself form a memory hierarchy comprising a number of storage circuits that could ultimately be backed by a main memory. The lower latency storage circuitry is designed to have lower worst-case scenario latency than the higher latency storage circuitry. By using the lower latency storage circuitry for storing data that is relevant to real time applications (or operating systems), it is known that data for those applications can be retrieved within a certain time limit. Other less time sensitive data can be stored in the other storage circuitry that offers a higher worst-case scenario latency— thus the storage space offered by the lower latency storage circuitry is not used up unnecessarily. Lower latency memory tends to have more limited storage available (for its circuitry size) than main memory in order to support the lower latency and hence it may not be desirable to use it exclusively. When the apparatus receives data access requests, these are forwarded to one of the storage circuitries as appropriate, depending on where the data that is the subject of the data access request resides. The apparatus itself also includes shared storage circuitry, which can be used to store data from either the lower latency storage circuitry or the higher latency storage circuitry. For instance, the apparatus could itself operate as a cache to the higher latency storage circuitry and the lower latency storage circuitry.

In some embodiments, the second port is additionally adapted to transmit the second data to the second storage circuit. In such embodiments, at least the second port could therefore be a read/write port for both receiving and transmitting data.

In some embodiments, the apparatus comprises writethrough circuitry to forward a write request for the second data to the second storage circuitry, wherein the access requests comprise the write request. In writethrough operations, data is not held in a 'dirty' state. Instead, when data that is held by the apparatus (e.g. in the shared storage circuitry) is modified, the modified data is kept and a request to update the backing storage for the second data—the second storage circuitry is sent to update the underlying copy of the data at the same time.

In some embodiments, the apparatus comprises linefill circuitry to store the second data in the shared storage circuit when a current capacity of the shared storage circuitry and the storage capacity of the shared storage circuitry enable the second data to be stored in the shared storage circuitry. Linefill circuitry is responsible for inserting data into the shared storage circuitry. In this case, if it is permitted, based on the capacity of the shared storage circuitry and its current occupancy, the linefill circuitry causes the second data to be stored in the shared storage circuitry. The skilled person will appreciate that there are a number of ways that the current occupancy can be measured. This could, for instance, be an overall current occupancy, or could be occupancy of data having a particular type (e.g. the second type).

In some embodiments, the apparatus comprises eviction circuitry to start an eviction operation on the shared storage circuitry in response to one of the access requests being received for the second data when a current capacity of the shared storage circuitry and the storage capacity of the shared storage circuitry inhibit storage of the second data, wherein the one of the access requests is forwarded to the second storage circuit substantially in parallel with the eviction operation being started. The eviction operation need not be an operation in which data is simply removed from the shared storage circuitry, but includes operations where data in the shared storage circuitry is overwritten or marked as invalid suitable for later overwriting. In these embodiments, when a request is received from the processing circuitry for second data when the current capacity of the shared storage circuitry is such that the second data could not be stored, then an eviction operation is begun. As above, the current capacity can be calculated in a number of ways and could be based on the overall occupancy of the shared storage circuitry as well as the occupancy of data of a particular type (e.g. the second type) in the shared storage circuitry.

In some embodiments, the one of the access requests is a non-allocating access. A non-allocating access occurs when the data is returned from the storage circuitry (e.g. the second storage circuitry) before the eviction operation is complete. The data is therefore not stored, but is instead passed back to the processing circuitry. Note that a decision as to whether the access request is allocating or non-allocating is not made until the data is returned, since it is at that point when it can be determined if the access has completed before the eviction operation is finished.

In some embodiments, the eviction circuitry is adapted to perform an overwrite operation as the eviction operation on stored data of the second type when the storage circuitry comprises the stored data of the second type. In such embodiments, where an eviction operation takes place in order to make space available for the accessed second data, the eviction operation takes place on data in the shared storage circuitry that is of the second type. Since data of the second type is written through, it is possible to directly overwrite this data without loss of data occurring; any modifications made to this data should already have been written through to the underlying storage circuitry. Consequently, the second data can be written immediately. In contrast, a writeback operation could be of a non-deterministic length of time. In particular, it can be difficult to predict how storage circuitry further up the hierarchy will act since such circuitry might have to perform its own evictions and in any case, being bigger, will potentially have a larger variance of access time. Hence, by targeting the eviction at data on which an overwrite can take place, the eviction process becomes more deterministic in length.

In some situations, the shared storage circuitry may not have any data of the second type and therefore an overwrite operation cannot be performed on this data. Consequently, in some embodiments, the eviction circuitry is adapted to perform the eviction operation on stored data of the first type when the storage circuitry lacks stored data of the second type and comprises stored data of the first type. This involves writing back the evicted data.

In some embodiments, in response to the eviction operation being incomplete when the second data is returned by the second storage circuitry, the second data is forwarded to the processing circuit. The eviction operation could be incomplete if the eviction operation caused a writeback operation to take place. This would be the case if, for instance, the eviction operation took place on data of the first type. In these cases, since no space will be available to store the second data, it is passed directly back to the processing circuit and is not stored. This makes it possible for the data to be retrieved without depending on the eviction taking place—which could take a non-deterministic period of time to complete, which would be inappropriate for the retrieval of data for a real-time application or operating system.

In some embodiments, a first proportion of the storage capacity is allocated to stored data of the first type; and a second proportion of the storage capacity is allocated to stored data of the second type. In this way, used of the shared storage circuitry is shared for the purpose of storing data of the first type and the second type. However, the amount of data of the first type is limited and the amount of data of the second type is limited.

In some embodiments, the first proportion and the second proportion are fixed. Consequently, the amount of storage used for the data of the first type and the data of the second type is not changeable.

In contrast, in some embodiments, the first proportion and the second proportion are dynamic. Thus, if little data of the first type is being stored in the shared storage circuitry then that space can be reallocated to storage of data of the second type.

In some embodiments, at least one of the first proportion and the second proportion are reducible to zero. Such embodiments make it possible for the storage circuitry to stop storing data of the first type or data of the second type.

In due course this could be changed so that data of the other type may be exclusively stored.

In some embodiments, the first proportion and the second proportion add up to 100% of the storage capacity.

In some embodiments, the first proportion is increased in response to the first proportion being insufficient to store the first data; and the second proportion is increased in response to the second proportion being insufficient to store the second data. The trigger for increasing the storage allocated to data of a particular type is therefore being unable to store data of that particular type, e.g. when it is received.

Some particular embodiments are now described with reference to the figures.

FIG. 1 shows an apparatus 100 in accordance with some embodiments. Within the apparatus 100 a processor 110 issues access requests for data. The access requests are received by a level one data cache 120, which is an example of the claimed apparatus. The access requests can relate to data that may be stored in one of a Low Latency RAM (LLRAM) 150 or a Dynamic RAM (DRAM) 140, which could be connected via an interconnect (not shown) to a bus 160 or a bus 170 of the apparatus 100. The LLRAM could, for instance, be implemented using an SRAM (Static RAM). A level two data cache 130 is provided to buffer data that is backed by the DRAM 140.

Data is stored in one of the LLRAM 150 and DRAM 140 in dependence on its purpose. For instance, data relating to real-time applications or operating systems is stored in the LLRAM 150 whilst other data is stored in the DRAM 140. The LLRAM 150 has a lower worst-case access time as compared to the DRAM 140. Consequently, when data is to be accessed from the LLRAM 150, it is possible to place an upper bound on the period of time that is required in order to obtain that data. In this way, data that is stored in the LLRAM 150 is suitable for real-time applications and operating systems where events must be responded to within a given period of time.

In contrast, other data can be stored in the DRAM 140 since, although fast access may be desirable, it may be less critical for non-real-time applications and operating systems. The level two data cache 130, level one data cache 120, and processing circuitry 110 collectively define a local system 180. The DRAM 140 and the LLRAM 150 fall outside this local system and consequently could be shared by other systems. In this embodiment, the DRAM 140 is shared between a number of clusters of processing circuits while the LLRAM 150 is shared by a single cluster of processing circuits. Access to the DRAM 140 and the LLRAM 150 is therefore provided by buses 160, 170.

Figure 2:
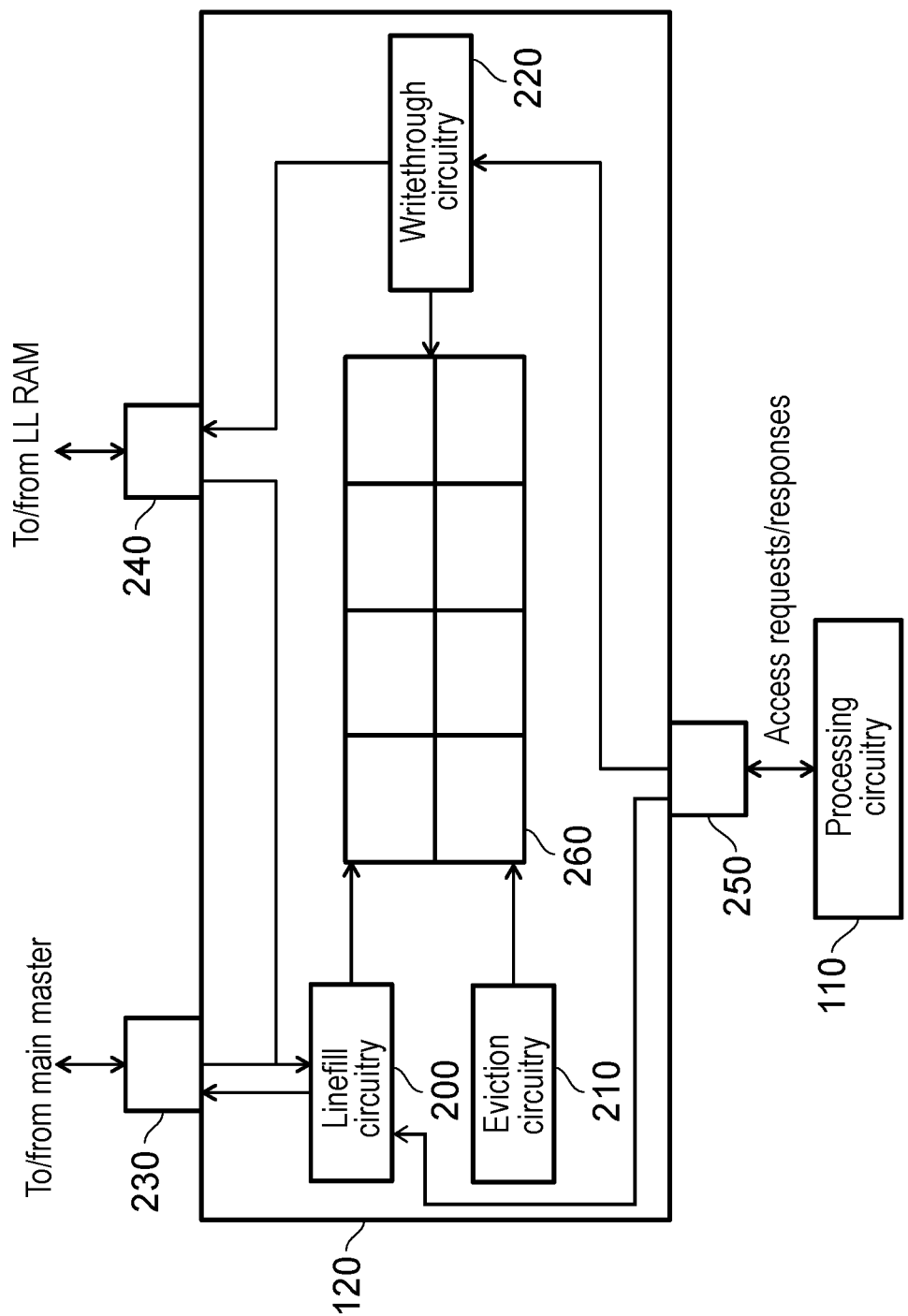
FIG. 2 schematically illustrates an example of the level one data cache in more detail.

FIG. 2 illustrates an example of the level one data cache 120 in more detail. In this example, the level one data cache 120 includes a port 250 from which the access requests and responses to access requests can be communicated with the processing circuitry 110. A further port 230 is provided in order to access the main master, which includes storage circuitry other than the LLRAM 150. A further port 240 is provided for the level one data cache 120 to communicate with the LLRAM 150 via the bus 170. The level one data cache 120 includes shared storage circuitry 260 for storing data that has been retrieved from the main master or from the LLRAM via the ports 230, 240. The possible organisation of the shared storage circuitry 260 is illustrated with respect to FIGS. 3A, 3B and 3C. Line fill circuitry 200 is provided to store data that is retrieved from the main master and LLRAM 150 in the shared storage circuitry 260. In addition, eviction circuitry 210 is provided in order to perform eviction operations on the shared storage circuitry 260 in order to free up space for line fills to occur.

The eviction circuitry 210 can operate in a number of ways. In some cases, the eviction circuitry 210 can perform writeback operations where data that is stored in the shared storage circuitry is written back to another storage circuit before being deleted or marked as being invalid in the shared storage circuitry 260. In contrast, the eviction circuitry 210 can perform eviction operation in the form of overwrite operations in which the data stored in the shared storage circuitry 260 is simply overwritten with new data. It will be appreciated that, since the process of overwriting does not necessitate any writeback operation occurring, it proceeds more quickly and in a more deterministic timeframe than when a writeback operation must take place. In particular, if a writeback operation initially occurs with respect to data stored in the shared storage circuitry 260 such that it is written back to the level two data cache 130, not only is the operation of writing the data into the level two data cache 130 unknown, but depending on the occupancy of the level two data cache 130, it is possible that writeback operations will be required to take place on the level two data cache 130 itself potentially up to the DRAM 140. Consequently, this process of writing back can take an unknown (and so not bounded for real time applications) period of time to occur.

In this embodiment, data loss is avoided in the case of an overwrite operation performed by the eviction circuitry 210 by the use of writethrough circuitry 220. When an access request is made from the processing circuitry 110 to alter data that is stored in the shared storage circuitry 260, which is backed by the LLRAM 150, the data in the shared storage circuitry 260 is updated. At the same time, the writethrough circuitry 220 forwards the access request to the LLRAM 150 where the underlying data is also modified. In this way, data that is backed by the LLRAM 150 is not stored in a "dirty" state in the shared storage circuitry 260. In contrast, dirty data may be stored in respect of data that is backed by the main master (e.g. by the DRAM 140).

The shared storage circuitry 260 can be configured in a number of different ways. In particular, the shared storage circuitry 260 can be configured in control how the shared storage 260 is shared for storage of data from the main master and from the LLRAM 150. This is important because the process of overwriting, which occurs with respect to data from the LLRAM 150 is much quicker than the writeback process that can occur with data from the main master. Consequently, the main master can fill the shared storage circuitry 260 with data by replacing data owned by the LLRAM 150 much more quickly than the LLRAM 150 can fill the shared storage circuitry 260 with data by replacing data owned by the main master. This then limits the extent to which the LLRAM 150 can insert into the shared storage circuitry 260 without experiencing a non-deterministic delay while the writeback process occurs. To prevent this, it is possible to enforce limitations on how the capacity of the shared storage circuitry 260 is shared. A number of examples are illustrated below.

In this embodiment, the main master is write-back rather than write-through and so requests from the processing circuitry 110 to the main master are made through the linefill circuitry 200 rather than through the write-through circuitry 220.

Figure 3A:
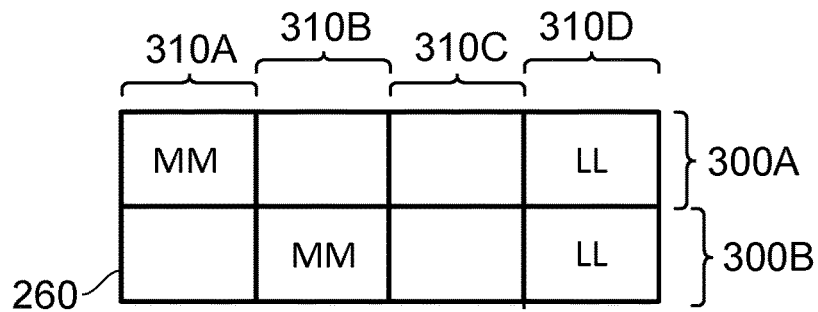
FIG. 3A shows an example of the shared storage circuitry.

FIG. 3A shows an example of the shared storage circuitry 260 comprising a four-set two-way storage circuit. That is to say that each item of data belongs to one of four different ways 310A, 310B, 310C, 310D. For each way, there are two set provided 300A, 300B. Thus, two items that belong in the same way can be stored simultaneously. In this embodiment, the allocation of storage to each of the four ways 310A, 310B, 310C, 310D is fixed. Consequently, data that arrives from the LLRAM 150 is stored in one of the ways 310D, while data from the main master is stored in the other ways 310A, 310B, 310C. Note that, as an alternative, the storage could be split between the sets rather than being the ways. That is, data from the LLRAM could be stored in one of the sets 300A while data from the main master could be stored in the other set 300B.

Figure 3B:
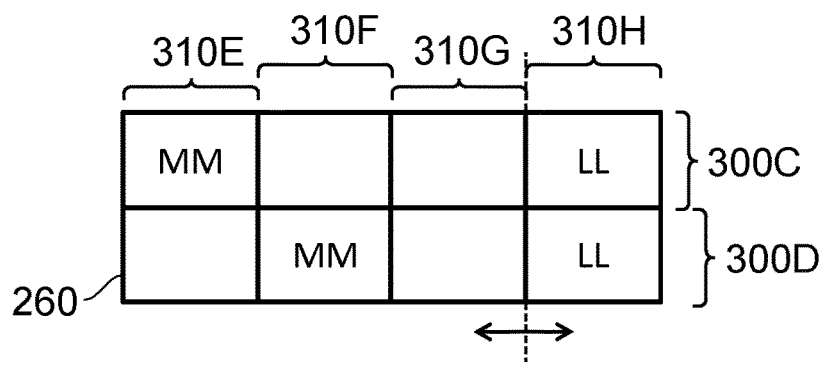
FIG. 3B shows another example of the shared storage circuitry.

FIG. 3B shows a situation in which the shared storage circuitry 260 is again made up of four ways 310E, 310F, 310G, 310H and two sets 300C, 300D. In this example, one of the ways 310H is reserved for use by the LLRAM 150, while the remaining ways 310E, 310F, 310G are provided for the main master. In this case, the proportion is not 50/50. Instead, 25% of the overall capacity of the shared storage circuitry 260 is provided for the LLRAM 150. However, in this embodiment, the amount of storage provided for the LLRAM 150 and for the main master is not static but is instead dynamic. Consequently, the proportion of storage that is allocated for the LLRAM 150 could change over time. For instance, if it is determined that insufficient storage is available for the LLRAM data 150 repeatedly, then the amount of storage allocated to the LLRAM 150 could be increased. For instance, the allocation could be increased to incorporate two additional ways 310F, 310G.

Figure 3C:
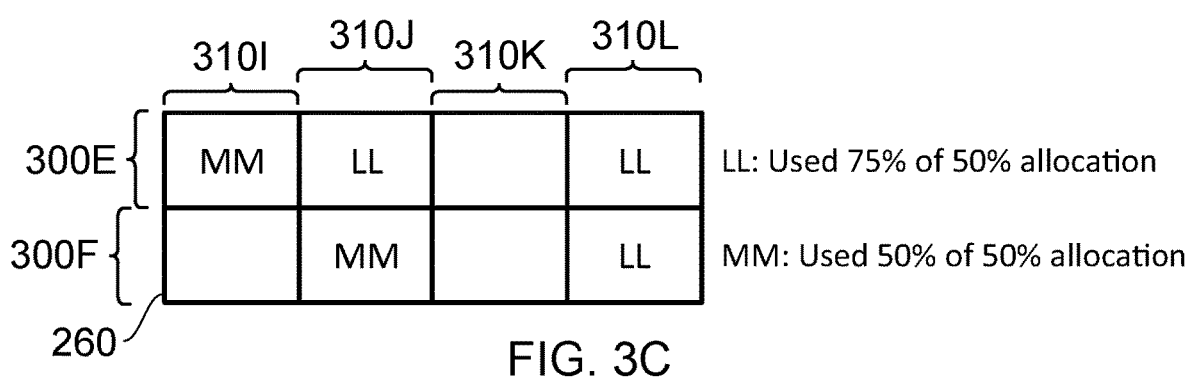
FIG. 3C shows another example of the shared storage circuitry.

FIG. 3C shows another example of the shared storage circuitry 260 consisting of four sets 310I, 310J, 310K, 310L each having two ways 300E, 300F. In this example, not only is the allocation dynamic, but the allocation is not split across one of the ways 300E, 300F or across one of the sets 310I, 310J, 310K, 310L. Instead, the number of bytes of data from each of the LLRAM 150 and the main master are monitored and a certain proportion of the storage is permitted for use by each of these storage circuits. In this example, each of the LLRAM 150 and the main master have been allocated 50% of the shared storage circuitry 260. As shown, the LLRAM 150 has used 75% of its allocation (3 out of 4 "blocks" of 64 bytes) whereas the main master has used 50% of its allocation (2 out of 4 "blocks" of 64 bytes). This provides greater flexibility in the sense that the most appropriate storage location for particular data can be provided and allowances need not be made for indexing into the shared storage circuitry 260 in different manners depending on whether the data is backed by the LLRAM 150 or the main master. However, this necessitates keeping a running total of the overall allocation used by the LLRAM 150 and the main master. Again, the actual allocation could be adjusted over time so that, for instance, the amount of storage allocated for use by the main master could be increased or decreased over time as requested.

Figure 4:
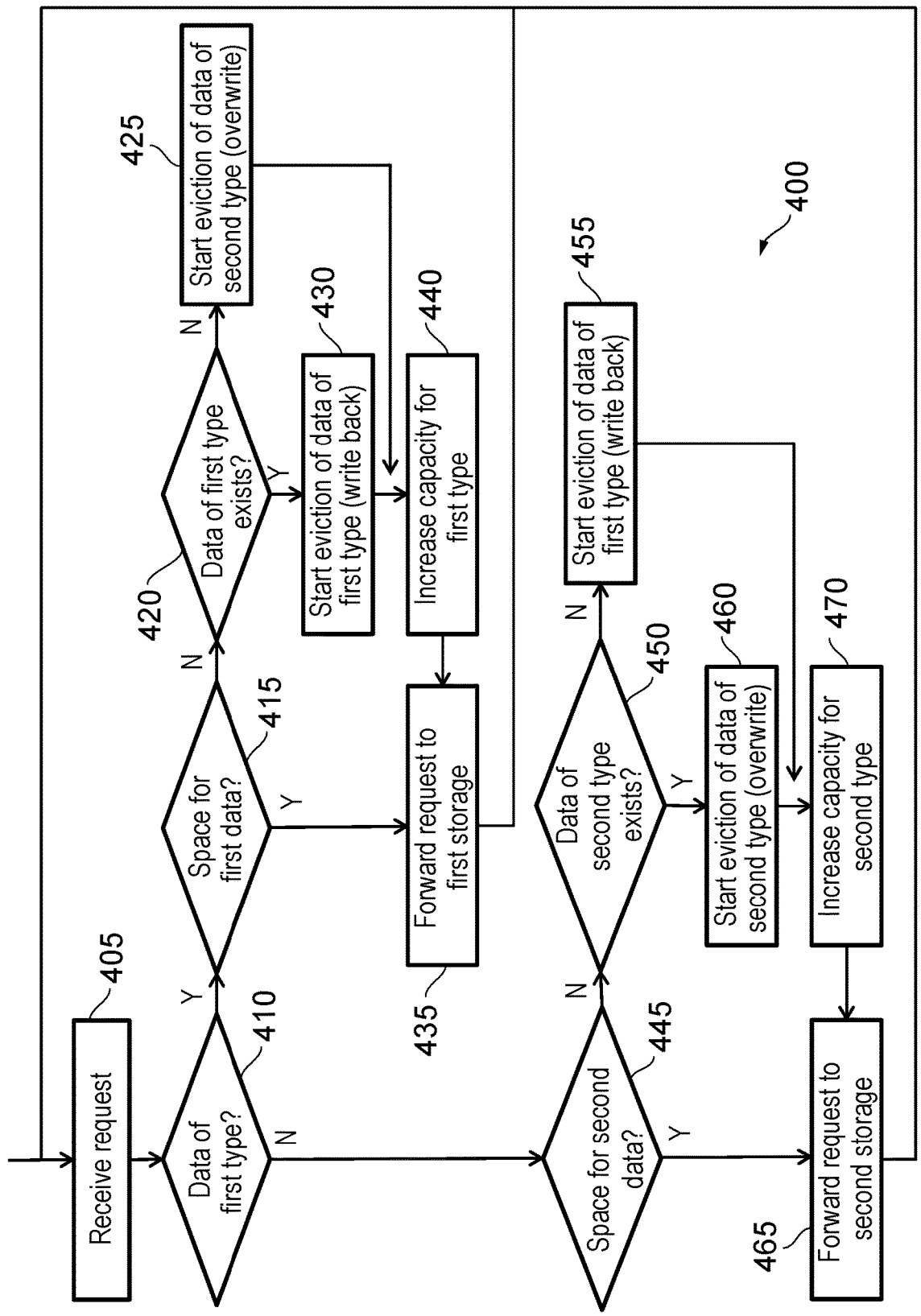
FIG. 4 illustrates a flow chart that shows the process of receiving a request and performing the eviction process in accordance with some embodiments.

FIG. 4 illustrates a flow chart 400 that shows the process of receiving a request and performing the eviction process in dependence on the state of the shared storage circuitry 260. At a step 405, a request is received, for instance, from the processing circuitry 110. The request may be received by the port 250, for example. At a step 410, it is determined whether the request is made in respect of data of the first type. In this case, data of the first time relates to data that is backed by the DRAM 140. This corresponds with data that is not used by real-time applications or operating systems, or data that is not required for real-time operations performed by such applications or operating systems. If the data is of the first type, then at step 415 it is determined whether there is space in the shared storage circuitry 260 for the first data to be stored once it has been retrieved. This therefore involves the consideration of the storage allocations, which have been discussed with respect to FIGS. 3A, 3B and 3C. If space is available, then at step 435, the request is forwarded to the first storage circuitry to be resolved. In this example, the request may be forwarded to the level two data cache 130, which either contains the requested data or must retrieve it from the DRAM 140. Having forwarded the request, the process then returns to step 405. If there is no space for the first data to be stored at step 415, then at step 420, it is determined whether data of the first type even exists in the shared storage circuitry 260. If so, then at step 430, eviction of the data of the first type is started via a writeback operation performed by the eviction circuitry 210. If not, then eviction of the data of the second type is started at step 425 by the eviction circuitry 210 performing an overwrite. This is because data of the second type is subject to writethrough operations by the writethrough circuitry 220 and so it is unnecessary for a writeback operation to occur since the data cannot be dirty. Then, regardless of whether data of the first type exists or not, the capacity for the first type of data is increased at step 440. This is because the current storage allocation in respect of the first type of data has been determined to be inadequate. The request is then forwarded to the first storage at step 435 as previously discussed. If at step 410, it is determined that the data that is the subject of the received request is not of the first type, then it is of the second type. Consequently, at step 445 it is determined whether there is space for the second data. If so, then at step 465, the request is forwarded to the second storage in the form of the LLRAM 150. Otherwise, at step 450, it is determined whether data of the second type exists in the shared storage circuitry. If so, then data of the second type is overwritten at step 460. If not, then data of the first type is written back and eviction started at step 455. In either event, at step 470, the capacity for the second type of data in the shared storage circuitry 260 is increased and at step 465 the request is then forwarded to the second storage circuitry as previously discussed. The process then returns to step 405.

Accordingly it can be seen that for preference, data of the second type is overwritten when data of the second type is to be retrieved. This is because the overwrite operation that is performed can be performed almost instantaneously and therefore there is no need to deal with the non-deterministic period of time for which the writeback operation and therefore the eviction must take place as is the case with evicting data of the first type. The eviction operation that occurs with respect to data of the second type, which starts in, for instance, steps 425 and 460, can take place substantially in parallel with the forwarding of the request that occurs in steps 435 and 465 respectively. In this way, the retrieval of the first data and the second data is not dependent on the eviction operation taking place.

Figure 5:
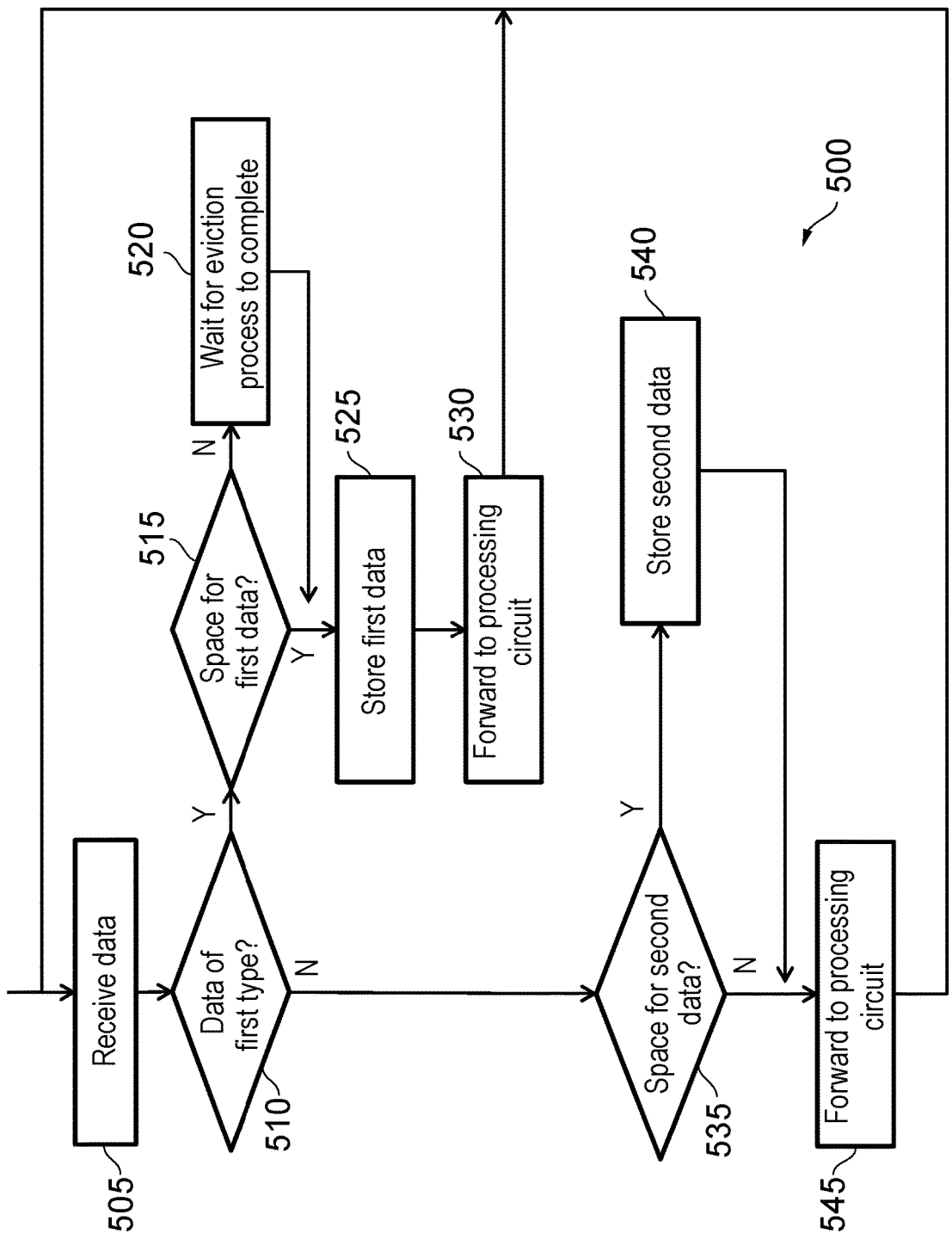
FIG. 5 illustrates a flow chart that shows a process of receiving data that has been requested by the apparatus, in accordance with some embodiments.

FIG. 5 illustrates a flow chart 500 that shows the process of receiving data that has been requested by the apparatus 120. At a step 505, the data is received. At a step 510, it is determined whether the received data is of the first type. If so, then at step 515 it is determined whether there is space for the first data to be stored in the shared storage circuitry 260. If not, then at step 520, the process waits for the eviction process to take place in order for the storage to be freed up. Note that in some embodiments, this may include some time out operation in which if, after a period of time, the eviction process has not completed, or if no space has been made available, then the process will simply proceed to step 530. Assuming this does not occur, then at step 525, which also occurs if space for the first data is available at step 515, the first data is stored. Then, at step 530, the received data is forwarded to the processing circuit. The process then returns to step 505. If, at step 510, the data is determined to not be of the first type, then at step 535, it is determined whether there is space for the data that is assumed to be of the second type. If not, then at step 545, the second data is forwarded directly to the processing circuit. Consequently, the second data is not stored. In contrast, if space is available, then at step 540, the second data is stored and the process then proceeds to step 545 where the data is forwarded. After step 545, the process returns to step 505. Consequently, it will be appreciated that the operation of storing the data occurs independently of the process of receiving the data. That is, that when the data is received, the apparatus does not wait to see if space can be freed up before forwarding it to the processing circuit when the data is of the second type. This is because data of the second type is data that relates to real-time applications and operating systems and consequently any unpredictable of non-deterministic delay in returning that data to the processing circuitry is undesirable. Collectively, FIGS. 4 and 5 illustrate a process in which, when the second data is requested, an attempt will be made in order to immediately free up data. If this is not possible, then an attempt is made in order to free up data where the period of time required to obtain that space in the shared storage circuitry 260 is non-deterministic. For instance, the eviction may take place in the form of data of the first type. This occurs in parallel with the request being sent to the LLRAM 150. Consequently, once a response is received from the LLRAM, it is checked as to whether the storage space has been obtained or not. If so, then the second data can be stored. However, if the storage space has not yet been acquired, then the apparatus does not wait for this storage space to become available, but instead merely forwards the data to the processing circuitry directly. The data is therefore not saved and consequently a non-allocating access has been performed.

It will therefore be appreciated that the above technique illustrates a way of segregating data for real-time operation as well as data that is not required for real-time operation. Furthermore, a shared storage circuitry 260 is provided that makes it possible to store both types of data in a single storage circuit without causing undue or unpredictable delays to real-time data that must be obtained and passed on to the processing circuitry.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. An apparatus comprising:
a first port adapted to receive first data of a first type from a first storage circuit;
a second port adapted to receive second data of a second type from a second storage circuit having a lower worst case latency in hardware than the first storage circuit;
a third port adapted to receive access requests for the first data and the second data from a processing circuit, wherein when one of the access requests is received for the first data, it is forwarded to the first storage circuit and when the one of the access requests is received for the second data, it is forwarded to the second storage circuit;
a shared storage circuit adapted to store the first data and the second data, the shared storage circuit having a storage capacity; and
eviction circuitry to start an eviction operation on the shared storage circuitry in response to one of the access requests being received for the second data when a current capacity of the shared storage circuitry and the storage capacity of the shared storage circuitry inhibit storage of the second data,
wherein the one of the access requests is forwardable to the second storage circuit substantially in parallel with the eviction operation being started.

2. The apparatus according to claim 1, wherein the second port is additionally adapted to transmit the second data to the second storage circuit.

3. The apparatus according to claim 1, comprising:
writethrough circuitry to forward a write request for the second data to the second storage circuitry, wherein the access requests comprise the write request.

4. The apparatus according to claim 1, comprising:
linefill circuitry to store the second data in the shared storage circuit when a current capacity of the shared storage circuitry and the storage capacity of the shared storage circuitry enable the second data to be stored in the shared storage circuitry.

5. The apparatus according to claim 1, wherein the one of the access requests is a non-allocating access.

6. The apparatus according to claim 1, wherein the eviction circuitry is adapted to perform an overwrite operation as the eviction operation on stored data of the second type when the storage circuitry comprises the stored data of the second type.

7. The apparatus according to claim 1, wherein the eviction circuitry is adapted to perform the eviction operation on stored data of the first type when the storage circuitry lacks stored data of the second type and comprises stored data of the first type.

8. The apparatus according to claim 1, wherein in response to the eviction operation being incomplete when the second data is returned by the second storage circuitry, the second data is forwarded to the processing circuit.

9. The apparatus according to claim 1, wherein a first proportion of the storage capacity is allocated to stored data of the first type; and
a second proportion of the storage capacity is allocated to stored data of the second type.

10. The apparatus according to claim 9, wherein the first proportion and the second proportion are fixed.

11. The apparatus according to claim 9, wherein the first proportion and the second proportion are dynamic.

12. The apparatus according to claim 11, wherein
at least one of the first proportion and the second proportion are reducible to zero.
13. The apparatus according to claim 11, wherein
the first proportion is increased in response to the first proportion being insufficient to store the first data; and
the second proportion is increased in response to the second proportion being insufficient to store the second data.
14. The apparatus according to claim 9, wherein
the first proportion and the second proportion add up to 100% of the storage capacity.
15. A method comprising:
receiving first data of a first type from a first storage circuit;
receiving second data of a second type from a second storage circuit having a lower worst case latency in hardware than the first storage circuit;
receiving access requests for the first data and the second data from a processing circuit, wherein when one of the access requests is received for the first data, it is forwarded to the first storage circuit and when the one of the access requests is received for the second data, it is forwarded to the second storage circuit;
storing the first data and the second data in a shared storage circuit, the shared storage circuit having a storage capacity;
starting an eviction operation on the shared storage circuit in response to one of the access requests being received for the second data when a current capacity of the shared storage circuitry and the storage capacity of the shared storage circuitry inhibit storage of the second data; and
forwarding the one of the access requests to the second storage circuit substantially in parallel with the eviction operation being started.
16. An apparatus comprising:
means for receiving first data of a first type from a means for storing first data;
means for receiving second data of a second type from a means for storing second data having a lower worst case latency in hardware than the means for storing first data;
means for receiving access requests for the first data and the second data from a means for processing, wherein when one of the access requests is received for the first data, it is forwarded to the means for storing first data and when the one of the access requests is received for the second data, it is forwarded to the means for storing second data; and
means for storing the first data and the second data together, the means for storing the first data and the second data together having a storage capacity
means for starting an eviction operation on the means for storing the first data and the second data together in response to one of the access requests being received for the second data when a current capacity of the means for storing the first data and the second data together and the storage capacity of the means for storing the first data and the second data together inhibit storage of the second data,
wherein the one of the access requests is forwardable to the means for storing second data substantially in parallel with the eviction operation being started.

\* \* \* \* \*